US009965486B2

(12) United States Patent
Wang et al.

(10) Patent No.: US 9,965,486 B2
(45) Date of Patent: May 8, 2018

(54) EMBEDDING INFORMATION WITHIN METADATA

(71) Applicant: Facebook, Inc., Menlo Park, CA (US)

(72) Inventors: George Siqiao Wang, Santa Clara, CA (US); Quenton Longmire Cook, San Francisco, CA (US); Daniel Kim, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 322 days.

(21) Appl. No.: 14/829,295

(22) Filed: Aug. 18, 2015

(65) Prior Publication Data

US 2017/0052973 A1   Feb. 23, 2017

(51) Int. Cl.
*G06F 17/30* (2006.01)
(52) U.S. Cl.
CPC ............... *G06F 17/30138* (2013.01)
(58) Field of Classification Search
CPC ...................................................... G06F 17/30
See application file for complete search history.

(56) References Cited

U.S. PATENT DOCUMENTS

| 2002/0001395 | A1* | 1/2002 | Davis | G06F 21/10 382/100 |
| 2014/0056512 | A1* | 2/2014 | Lerios | G06T 3/00 382/162 |
| 2015/0066941 | A1* | 3/2015 | Martin | G06F 17/30321 707/741 |

OTHER PUBLICATIONS

Mack, Ryan, "Under the Hood: Improving Facebook Photos", Mar. 22, 2012, available at https://www.facebook.com/notes/facebook-engineering/under-the-hood-improving-facebook-photos/10150630639853920/.*

* cited by examiner

*Primary Examiner* — Khanh B Pham
(74) *Attorney, Agent, or Firm* — Baker Botts, L.L.P.

(57) ABSTRACT

In one embodiment, a method includes receiving a datafile and associated metadata, wherein the associated metadata has a reserved area of storage space and a known format, determining a sampled format for the associated metadata, wherein the sampled format creates available spaces within the reserved area of storage space, determining data to be embedded in the associated metadata, inserting the data to be embedded into a least one of the available spaces, and providing the datafile and the associated metadata with the inserted data.

18 Claims, 7 Drawing Sheets

EMBEDDING INFORMATION WITHIN METADATA

TECHNICAL FIELD

This disclosure generally relates to metadata.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a computing device may provide dedicated (and isolated) memory and file storage space for each application running on the computing device, which may hamper sharing of information between the applications. In particular embodiments, a particular application running on a computing device may embed information within an existing datafile (e.g., in a metadata field associated with the datafile) stored in a shared area of the file storage space in order to facilitate sharing of the embedded information with other applications running on the computing device. In particular embodiments, the metadata field may reside in a reserved area of storage space (e.g., a header or footer portion of the datafile) and/or the metadata may be stored in a particular format. In particular embodiments, the computing device may find space in the metadata field in which to store the information by either detecting available space in the metadata field (e.g., when the metadata does not occupy the entire metadata field) or creating available space in the metadata field (e.g., by re-writing the metadata in a sampled format). In particular embodiments, the computing device may then embed the information within the metadata by inserting it into the available space. In particular embodiments, the embedded information may be used to authenticate the user, share information about the user between applications, or facilitate customization of a newly-installed application for the user.

In particular embodiments, upon receiving a datafile with associated metadata stored in a known format, a computing device may determine that the metadata stored within the metadata field may alternatively be represented in a sampled format. In further embodiments, the determined sampled format of the metadata may not affect the quality or character of the original file. That is, a computing device may reformat the associated metadata, such that the reformatted metadata does not occupy the entire metadata field. In further embodiments, a user who subsequently views or requests the datafile may be unable to tell the metadata of the file or the file itself has been altered.

In particular embodiments, upon determining a sampled format of the metadata, the reserved area of storage space (e.g., the metadata field) previously used for storing the metadata may now store the sampled set of the metadata in addition to new information to be stored in the metadata field. In particular embodiments, a computing device may insert data within the metadata field of the sampled metadata (i.e., in the newly created empty space from converting the metadata into a sampled format). In particular embodiments, a computing device may embed any type of information within the new empty storage space contained in the metadata field so long as the inserted data fits within the metadata field.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
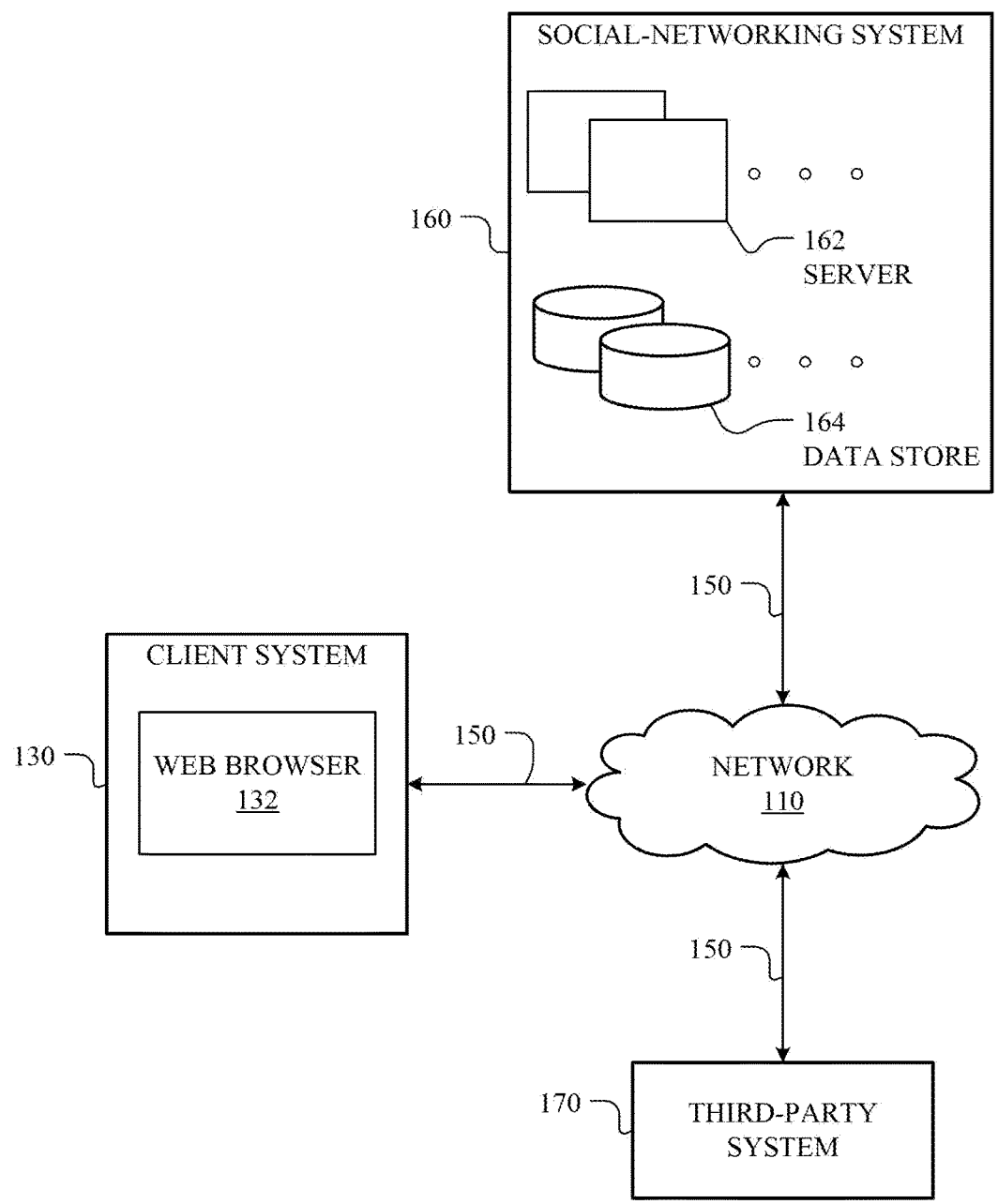
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
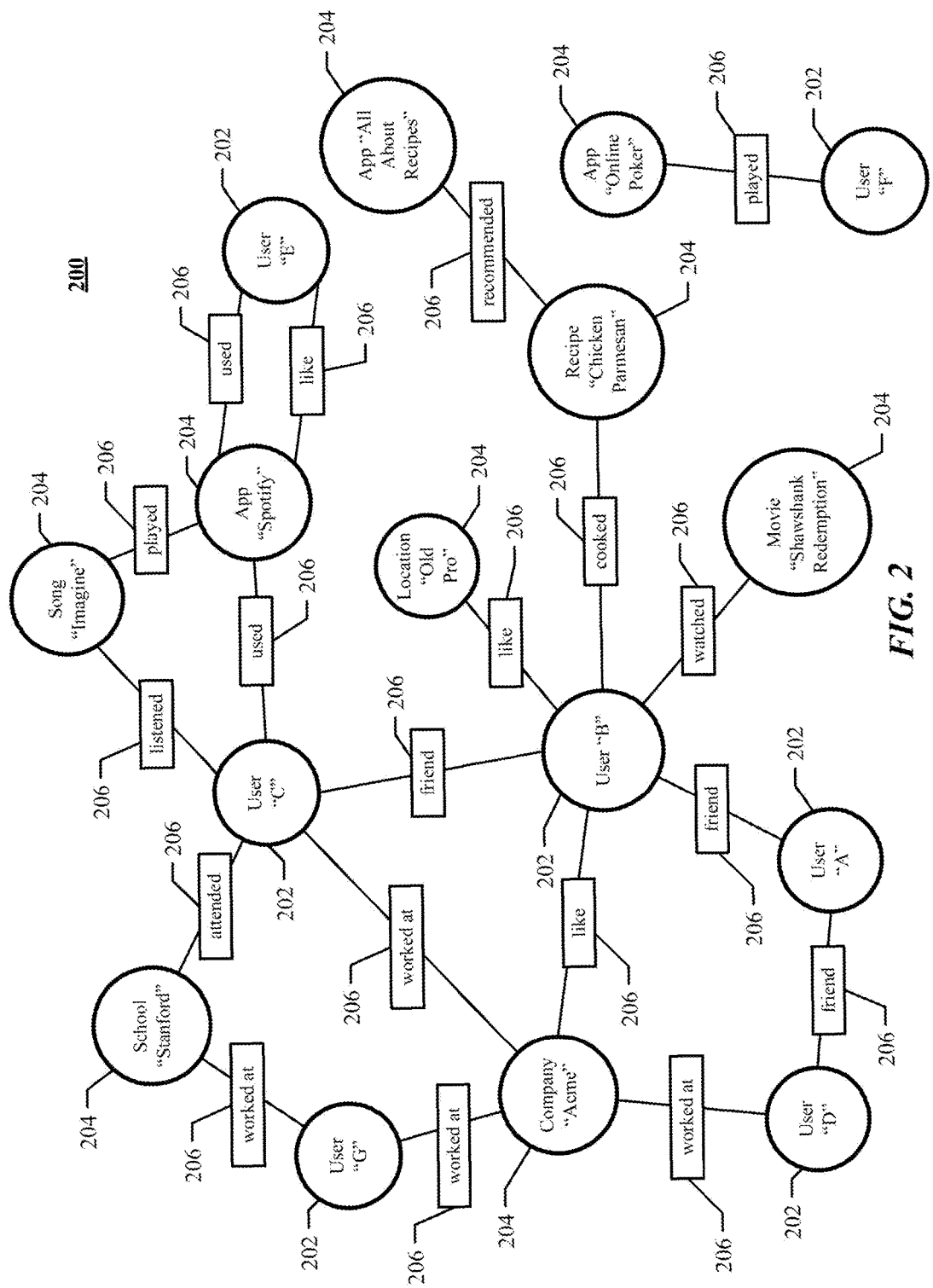
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, a computing device may provide dedicated (and isolated) memory and file storage space for each application running on the computing device, which may hamper sharing of information between the applications. In particular embodiments, a particular application running on a computing device may embed information within an existing datafile (e.g., in a metadata field associated with the datafile) stored in a shared area of the file storage space in order to facilitate sharing of the embedded information with other applications running on the computing device. In particular embodiments, the metadata field may reside in a reserved area of storage space (e.g., a header or footer portion of the datafile) and/or the metadata may be stored in a particular format. In particular embodiments, the computing device may find space in the metadata field in which to store the information by either detecting available space in the metadata field (e.g., when the metadata does not occupy the entire metadata field) or creating available space in the metadata field (e.g., by re-writing the metadata in a sampled format). In particular embodiments, the computing device may then embed the information within the metadata by inserting it into the available space. In particular embodiments, the embedded information may be used to authenticate the user, share information about the user between applications, or facilitate customization of a newly-installed application for the user.

In particular embodiments, upon receiving a datafile with associated metadata stored in a known format, a computing device may determine that the metadata stored within the metadata field may alternatively be represented in a sampled format. In further embodiments, the determined sampled format of the metadata may not affect the quality or character of the original file. That is, a computing device may reformat the associated metadata, such that the reformatted metadata does not occupy the entire metadata field. In further embodiments, a user who subsequently views or requests the datafile may be unable to tell if the metadata of the file or the file itself has been altered.

In particular embodiments, upon determining a sampled format of the metadata, the reserved area of storage space (e.g., the metadata field) previously used for storing the metadata may now store the sampled set of the metadata in addition to new information to be embedded in the metadata. In particular embodiments, a computing device may insert data within the metadata field of the sampled metadata (i.e., in the newly created empty space from converting the metadata into a sampled format). In particular embodiments, a computing device may embed any type of information within the new empty storage space contained in the metadata field so long as the inserted data fits within the metadata field.

Figure 3A:
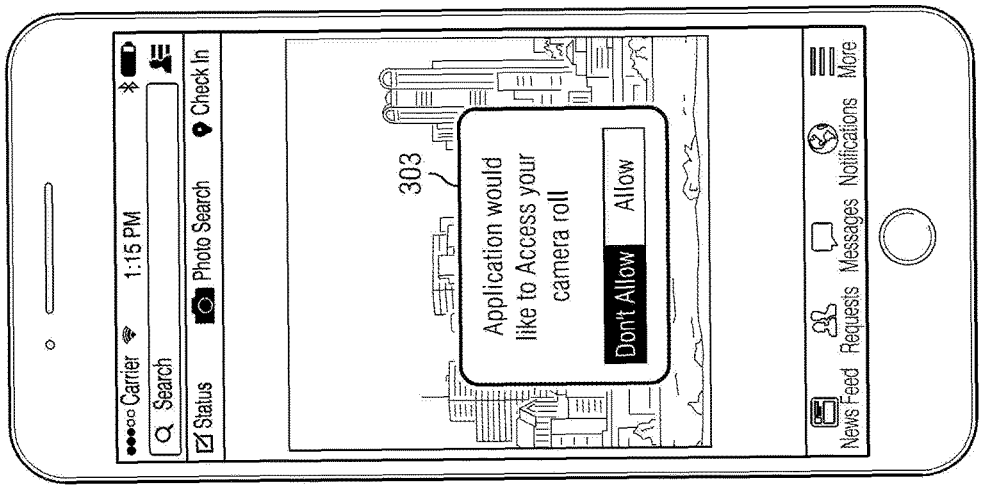
FIG. 3A illustrates an example of capturing an image through an application associated with social-networking system.

In particular embodiments, a particular application running on client device 130 may embed information within the metadata stored in the metadata field associated with a datafile. In particular embodiments, upon client device 130 capturing an image, information about a user of client device 130 may be embedded in the metadata in the metadata field of the image. In particular embodiments, client device 130 may access social-networking system 160 using a web browser 132, or a native application associated with social-networking system 160 (e.g., a mobile social-networking application, a messaging application, another suitable application, or any combination thereof) either directly or via network 110. In particular embodiments, client device 130 may be a desktop computer, a laptop computer, a tablet computer, a smartphone, or any suitable computing device. In further embodiments, client device 130 may comprise a camera. FIG. 3A illustrates an example of capturing an image through an application associated with social-networking system 160. As an example and not by way of limitation, in FIG. 3A, user Tom Brady has accessed social-networking system 160 interface to capture image 302. In particular embodiments, the interface may display a camera preview window (i.e., a camera viewfinder). For example, client device 130 may display in its display social-networking system's 160 interface including an area that displays an image generated by the camera. Tom Brady may then select the 'Capture Image' option 301 within the user interface which may allow client device 130 to capture image 302. In particular embodiments, upon Tom Brady capturing image 302, an application may embed information within the metadata associated with the image file. In further embodiments, social-networking system 160 may instruct client device 130 to generate image 302 file according to a particular format. In particular embodiments, social-networking system 160 may instruct client device 130 that the captured image generate a color profile using the TINYsRGB color space (TINYsRGB described in further detail below). In particular embodiments, the metadata contained within the metadata field of a TINYsRGB color space may not comprise the entire metadata field (i.e., the metadata field may comprise of 3 kb of space, but the metadata contained within the field only uses 1 kb of space). In particular embodiments, social-networking system 160 may insert information within the available space in the metadata field for the TINYsRGB color profile.

Figure 3B:
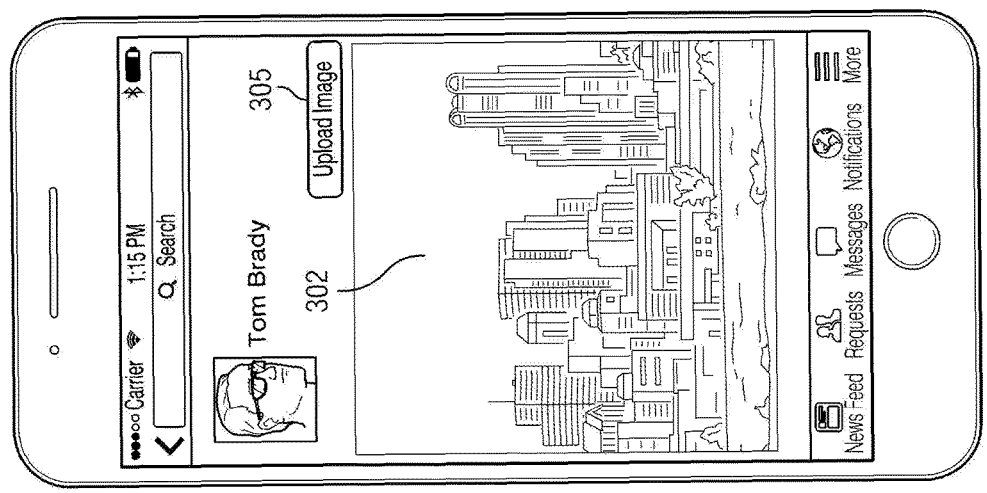
FIG. 3B illustrates an example of the online sharing functionality of social-networking system through uploading images stored on client device.

In particular embodiments, a particular application running on client device 130 may embed information within the metadata stored in the metadata field of an image upon client device 130 uploading the image to social-networking system 160. FIG. 3B illustrates an example of the online sharing functionality of social-networking system 160 through uploading images stored on client device 130. In FIG. 3B, user Tom Brady has accessed a particular application associated with social-networking system 160. In particular embodiments, Tom Brady may be presented with a user interface to upload image 302 to the social-networking system 160. Tom Brady may select the 'upload' option 305 within the user interface which may allow Tom Brady to upload image 302 to social-networking system 160. In particular embodiments, upon uploading image 302 to social-networking system 160, social-networking system 160 may determine whether image 302 is in a particular format. In particular embodiments, the particular format may be a type of formatted metadata that does not use the entire metadata field for storage of metadata. In particular embodiments, the particular format may be TINYsRGB, however is not limited to such format. In particular embodiments, upon determining image 302 is in the particular format, social-networking system 160 may instruct client device 130 to embed information within the metadata stored in the metadata field of the image.

In particular embodiments, upon social-networking system 160 receiving the image for upload, social-networking system 160 may determine the image is not in a particular format. In such a case, social-networking system 160 may first determine the format of the metadata stored within the metadata field of the image. Upon determining the format of the metadata associated with the image, social-networking system 160 may then determine whether the metadata within the metadata field associated with the image may be represented in a sampled format. For example, and explained in further detail below, a tone response curve (the data points of the curve being stored within a metadata field of an image) may contain over 1000 points of data. In particular embodiments, an application associated with social-networking system 160 may convert the 1000 points of data into a sampled set, thereby reducing the 1000 points of data to less than 100 points of data. In particular embodiments, in representing the metadata of an image in a sampled format, the metadata field may contain available space of which may be used to store additional information. In particular embodiments, the information stored within the metadata field may be used to authenticate the user, share information about the user between applications, or facilitate customization of a newly-installed application for the user.

Figure 3C:
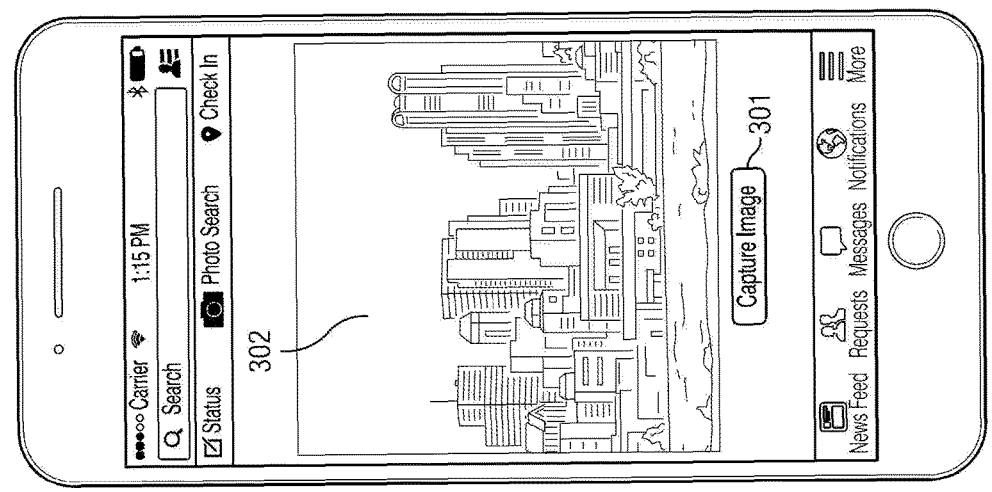
FIG. 3C illustrates another example of the online sharing functionality of social-networking system by allowing access to images stored on client device.

In particular embodiments, social-networking system 160 may need not wait for a user to capture or upload an image to insert information in a metadata field. In particular embodiments, social-networking system 160 may access the shared space on client device 130 (e.g., the camera roll) and reformat the color profiles stored in the camera roll to a sampled format. In particular embodiments, a particular application running on client device 130 may request permission to access a shared storage on client device 130. In particular embodiments, the shared storage may be the camera roll of client device 130. In particular embodiments, the access permission may grant read and write privileges to the shared storage space on client device 130. FIG. 3C illustrates another example of the online sharing functionality of social-networking system 160 by allowing access to images stored on client device 130. In FIG. 3C, upon Tom Brady accessing social-networking system 160, Tom Brady may be presented with an option from social-networking system 160. For example, social-networking system 160 may present Tom Brady with a message asking permission for social-networking system 160 to access Tom Brady's camera roll. In particular embodiments, once a user of social-networking system 160 has granted permission to access a users camera roll on client system 130, social-networking system 160 may access each of the one or more images stored in the camera roll of client device 130.

In particular embodiments, an application associated with social-networking system 160 may have read and write access to the camera roll of client device 130. In particular embodiments, social-networking system 160 may determine whether any of the one or more images stored on client device 130 are within a particular format. In further embodiments, upon social-networking system 160 determining an image is in a particular format, social-networking system 160, client device 130, or the application associated with social-networking system 160 may insert information within the metadata stored in the metadata field of the image.

In further embodiments, social-networking system 160 may automatically upload Tom Brady's one or more images stored on client system 130. As an example and not by way of limitation, client system 130 may automatically and without manual input from a user upload the images stored on client system 130 to social-networking system 160 through photo-synching depending on settings of the user, as described below. In particular embodiments, an application or operating system (OS) of client system 130 may upload images to the social-networking 160 or third-party 170 system, where the images may be saved to an archive or shared space of client device 130.

In particular embodiments, client device 130 may only be instructed to convert one image stored in the user's camera roll to a sampled format in order to include information within the metadata. In further embodiments, each of the one or more images on client device 130 may be converted and embedded with information in the metadata. In further embodiments, social-networking system 160 may only encode images taken by the user of client device 130. As an example and not by way of limitation, upon being granted access to a camera roll of client device 130, social-networking system 160 may read the metadata associated with each image to determine which images were taken by client device 130. In particular embodiments, social-networking system 160 may assume an image captured by client device 130 was taken by the user of client device 130. In further embodiments, social-networking system 160 may retrieve the metadata associated with the images on the shared camera roll and determine which images contain metadata identifying the user of client device 130 as the author of the image. In particular embodiments, social-networking system may then convert the images captured by the user to a sampled format and embed information within the metadata.

In particular embodiments, the datafile with associated metadata may be an image. In further embodiments, the image may be of a JPEG format with associated metadata, wherein the associated metadata contains information regarding the color space of the JPEG file. In further embodiments, the color space of the JPEG file may contain multiple tone response curves. In further embodiments, social-networking system 160 may alter or edit the metadata associated with the image, converting the metadata into a sampled set, and thereafter embed the information associated with social-networking system 160 in the metadata of the JPEG image. In further embodiments, social-networking system 160 may embed information within any type of datafile or image file.

In particular embodiments, metadata from images may include the file, EXIF, Maker Notes, IPTC, ICC Profile, XMP, PrintM, and others. In particular embodiments, the metadata generated by social-networking system 160 may be stored in any of the described metadata types. In particular embodiments, the file metadata may describe the image itself. In further embodiments, the file metadata may include the type of image (e.g., JPEG or PNG), internal formats, dimensions, and colors. In particular embodiments, if there is a comment in the file's header, then it may be included in the file metadata. In particular embodiments, social-networking system 160 may store information within the EXIF. In particular embodiments, the EXIF may be used by camera manufactured to identify information about the camera's settings used for the photo. In further embodiments, the EXIF may include timestamp information, camera make/model, lens setting, etc.

In particular embodiments, social-networking system 160 may store metadata in the International Color Consortium (ICC) defined color-space transformation system using a set of ICC Profiles. In particular embodiments, color profiles may be used to convert the raw RGB values and the intended color tone.

Digital images may be expressed within a color space. A color space refers to a specific implementation of a color model for representing colors that comprise an image. Color spaces help to ensure consistency in color representation across the potentially numerous different devices that may display an image. For example, image 302 in FIG. 3A may be created by a digital camera, copied to client device 130, and uploaded to social-networking system 160. The digital camera, client device 130 and social-networking system 160 may each interpret image 302 with reference to a color space.

A digital image may be comprised of a series of pixels. According to some color spaces, each pixel may be represented as a triplet of numerical values. In one such family of color spaces, these values correspond to the level of red (R), green (G), and blue (B) primary colors present in the pixel. Every color space in this family is known as the RGB color space. There are multiple RGB color spaces depending on exactly which shade or hue of red, green, and blue is used as the primary color for R, G, and B. In one implementation of an RGB color space, each of the RGB values may be expressed as an integer between 0 and 255, (i.e., a byte). A value of 0 may correspond to the darkest shade of a primary color, whereas a value of 255 may correspond to the lightest shade. Thus [0,0,0] corresponds to black and [255,255,255] corresponds to white. An RGB color space may be conceptualized as a device-specific color space, since it defines color parameters that are unique to a particular device. Each device may use a unique shade of each of the red, green, and blue primaries.

In particular embodiments, because different color space may be best suited for different purposes, it may be necessary to transform an image from one color space to another color space. For example, the XYZ and sRGB color spaces are among the most well-established and widely recognized color spaces in use today. To optimize the display of an image on a different device from the device on which it was created, it may be desirable to transform the image from a device-specific color space, such as RGB to an absolute color space such as XYZ. Such color space transformations are facilitated by color profiles associated with digital images. A color profile provides a model for transforming an image from one color space to another color space.

Color profile files may take many forms. A common format for color profiles relies on standard specifications defined by the International Color Consortium, an industry organization that defines cross-platform color management standards. The standard specifications may use a tag-based file format to represent color space transformations. The tag-based format may include a profile header, a tag table, and tagged element data. The header is a fixed-length section structured in a format dictated by a standard specification. The header may contain information that every file formatted to comply with the standard specification is required to contain, e.g., version information. The tag table is a lookup table that specifies which portion of the tagged element data corresponds to particular fields and the offsets for each filed. The specification defines the set of tags that may or must be present in a color profile, and also may impose some constraints on the contents of the tagged element data section.

In particular embodiments, color profiles are normally transmitted with an image file or embedded within the image file (if the file supports embedded metadata). When the image needs to be rendered on a device (e.g., a monitor or printer), a color management system may transform the image pixels to an absolute color space using the color profile of the image and further transform them from the absolute color space to a color space specific to the recipient device using a color profile unique to that device.

In particular embodiments, social-networking system 160 may convert the color profile of an image from a known color profile to a particular color profile. In further embodiments, upon converting a known color profile (e.g., an ICC Color Profile) to a particular color profile (e.g., TINYsRGB, discussed below), the particular color profile may contain available space in which information may be embedded in the existing metadata. In particular embodiments, social-networking system 160 may transform one color profile to another, in which the transformation may result in significant reductions in data requirements and processing bandwidth for color profiles and color space transformations without sacrificing image quality.

In particular embodiments, an example of the sRGB profile may use roughly 3000 bytes of space. The following illustrates an example of the amount of space used by each Tag in the sRGB profile:

| Tag | Data | Size | Description |
| --- | --- | --- | --- |
| Header | | 128 | |
| 'desc' | 'desc' | 94 | Localized description strings |
| 'cprt' | 'text' | 11 | Copyright ASCII Text String |
| 'wtpt' | 'XYZ' | 20 | Media white-point tristimulus |
| 'bkpt' | 'XYZ' | 20 | Media black-point tristimulus |
| 'rXYZ' | 'XYZ' | 20 | Red colorant tristimulus |
| 'gXYZ' | 'XYZ' | 20 | Green colorant tristimulus |
| 'bXYZ' | 'XYZ' | 20 | Green colorant tristimulus |
| 'rTRC' | 'curv' | 2060 | Red tone response curve |
| 'bTRC' | 'curv' | 2060 | Blue tone response curve |
| 'gTRC' | 'curv' | 2060 | Green tone response curve |

In particular embodiments, the tone response curves may use the most amount of space in the metadata field of the sRGB profile. In particular embodiments, a color profile may share the 2060 bytes associated with the red, green, and blue tone response curves across the entire profile. That is, the red, green, and blue only use 2060 bytes of space, and not 6180 bytes.

Figure 4A:
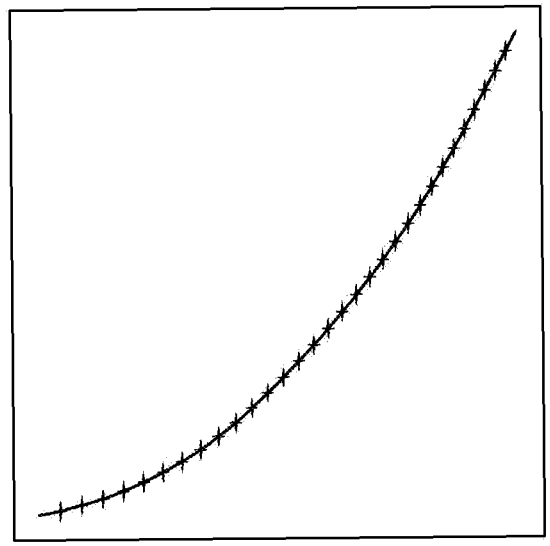
FIG. 4A represents a standard sRGB tone response curve.

In particular embodiments, rTRC, gTRC, and bTRC are the Red, Green, and Blue tone reproduction curves that define device or color space gamma input and monitor profiles. Generally, tone reproduction may be the mapping of scene luminance and color to print reflectance or display luminance. For example, the tone response curves may define the graph showing the relationship between the numbers in the file and what is displayed as output on a monitor or printer. FIG. 4A represents a standard sRGB profile curve. In particular embodiments, a standard sRGB profile tone response curve may represent the sampling of 1024 points along the curve.

In particular embodiments, upon social-networking system 160 receiving or reading an image, social-networking system 160 may read the metadata associated with an image and determine the color space of the image is defined by the standard sRGB color space. In particular embodiments, once social-networking system 160 has determined and recognized the metadata of a specific image, file, or datafile, social-networking system 160 may determine whether or not the metadata associated with image, file, or datafile may be represented by a sampled format.

Figure 4B:
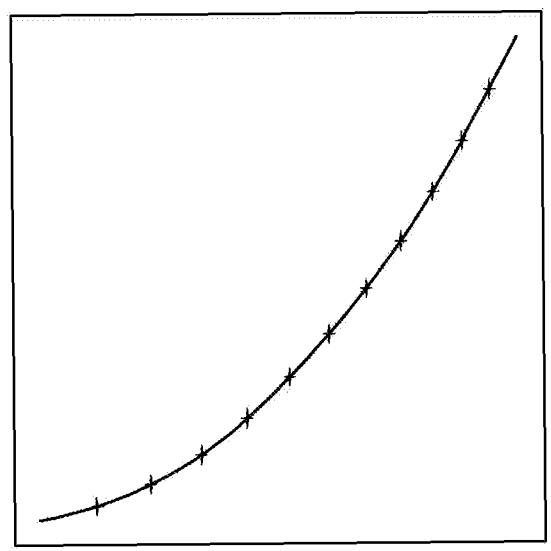
FIG. 4B represents a standard a TINYsRGB profile curve.

In particular embodiments, and with reference to FIG. 4A, the sRGB tone response curve may represent 1024 points along the curve. In particular embodiments, an image file may be of different types of formats. For example, an image may be a JPEG, JFIF, EXIF, TIFF, RIF, GIF, BMP, PNG, etc. In particular embodiments, a JPEG format image may only have 256 possible values for each color. In particular embodiments, a tone response curve for a jpeg image may only need to be represented by 256 data points. In further embodiments, a tone response curve may consist of only 26 points and still represent the same tone response curve consisting of the 1024 points and display the same quality and color of the larger data set. FIG. 4B represents the tone response curve of the TINYsRGB profile. In particular embodiments, social-networking system 160 may receive an image comprising a sRGB color profile and convert the color profile to a TINYsRGB profile, thereby reducing the amount of data stored in the reserved storage space of the metadata field. With reference to the conversion between sRGB to TINYsRGB, these steps and methods are disclosed in U.S. Pat. No. 8,953,876, entitled "Creation of a Color Profile of an Image" and filed 22 Aug. 2012, which is incorporated herein by reference as an example and not by way of limitation.

As stated above, an example of the sRGB profile may use roughly 3000 bytes of space, however, in particular embodiments TINYsRGB may only use 524 bytes of space. The following illustrates an example of the amount of space used by each Tag in the TINYsRGB profile:

| Tag | Data | Size | Description |
| --- | --- | --- | --- |
| Header | | 128 | |
| 'desc' | 'desc' | 94 | Localized description strings |
| 'cprt' | 'text' | 11 | Copyright ASCII Text String |
| 'wtpt' | 'XYZ' | 20 | Media white-point tristimulus |
| 'bkpt' | 'XYZ' | 20 | Media black-point tristimulus |
| 'rXYZ' | 'XYZ' | 20 | Red colorant tristimulus |
| 'gXYZ' | 'XYZ' | 20 | Green colorant tristimulus |
| 'bXYZ' | 'XYZ' | 20 | Green colorant tristimulus |
| 'rTRC' | 'curv' | 64 | Red tone response curve |
| 'bTRC' | 'curv' | 64 | Blue tone response curve |
| 'gTRC' | 'curv' | 64 | Green tone response curve |

In particular embodiments, upon converting the sRGB profile to a TINYsRGB profile, the amount of space taken by the metadata stored in the metadata field may have been reduced, thereby allowing the TINYsRGB to store new information. For example, the sRGB tone response curve may use roughly 2 kb of the 3 kb of reserved storage, wherein the other 1 kb of data may be used for header information, copyright, and tristimulus data, thereby leaving no room for additional storage of information within the color profile. However, the TINYsRGB profile may only use 524 bytes of space, allowing additional information to be embedded in the metadata stored in the metadata field.

In particular embodiments, upon converting the metadata of the datafile into a sampled format, new information may be stored within the metadata field. In particular embodiments, the new embedded information may be used to authenticate the user, share information about the user between applications, or facilitate customization of a newly-installed application for the user.

In particular embodiments, the system may embed any type of information in the available space(s) in the metadata. As described above, the system may include anonymous demographic or other information about the user. In particular embodiments, demographic user information may include, name, sex, the user's interests (e.g., golf, gardening, movies, etc.), favorite books, occupation, income, city of residence, etc. In further embodiments, other information may include user-identifying information, social graph information, preferences, privacy information, or permissions.

In particular embodiments, social-networking system 160 may embed information about the user within the metadata stored in the metadata field. In particular embodiments, images that have been uploaded to social-networking system 160 or stored on client device 130 may already be associated with metadata. In particular embodiments, images to be accessed by social-networking system 160 may include associated metadata. The metadata associated with an image may be automatically generated (e.g., by the camera that is the source of the image). Automatically-generated metadata associated with an image may, for example, include information regarding the image and may be stored as EXIF (Exchangeable Image File Format) data. The metadata may include information such as a date and time when the image was taken, the location where the image was taken (e.g., GPS coordinates), compression applied to the image, camera model, and camera settings (e.g., resolution, color information, flash usage, exposure, shutter speed, aperture, focal length, or ISO speed). In particular embodiments, metadata associated with an image may be automatically generated but manually edited (e.g., edited in a photo application on client system 130). In other embodiments, metadata associated with an image may be manually generated (e.g., by the camera user or by the user of client system 130).

As stated above, if the image is a photo taken at a particular location or time, the photo may be embedded with information including the location (which may, in particular embodiments, correspond to a concept node in the social graph). Similarly, if the image is a photo that contains buildings, logos or brands, or any place or thing associated with concept nodes in the social graph, the metadata may be embedded with information including the identifiers of the corresponding concept nodes.

In further embodiments, the information created by social-networking system 160 and stored within the images on client device 130 may relate to the demographic information of the user. For example, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific.

In further embodiments, the social-networking system 160 may embed the one or more images stored on client device 130 with information associated with user nodes 202 of social graph 200. As an example and not by way of limitation, the user may provide his name, profile picture, contact information, birth date, gender, marital status, family status, employment, education background, preferences, interests, or other demographical information to be included in the user node 202. In particular embodiments, upon social-networking system 160 gaining access to the one or more images stored on client system 130, social-networking system 160 may embed the image with metadata associated with user node 202.

In particular embodiments, social-networking system 160 may embed the metadata of the one or more images stored on client device 130 with information associated with concept nodes 204 of social graph 200. In particular embodiments, social-networking system 160 may look to each concept 202 within nth degree of separation from user node 202 to determine which information social-networking system 160 may embed within the metadata of the one or more images stored client device 130. For example, a concept may correspond to a place (such as, for example, a movie theater, a restaurant, a landmark, or a city), a website (such as, for example, a website associated with the social-network system or a third-party website), an entity (such as, for example, a person, a business, a group, a sports team, or a celebrity), real or intellectual property (such as, for example, a sculpture, a painting, a movie, a game, a song, an idea, a photograph, or a written work), an application, a game, an idea or theory, another suitable concept, or two or more such concepts. In particular embodiments, social-networking system 160 may store concept node 204 information (user of client device 130 has been to Landmark Theatre 16 in San Francisco, likes Justin Bieber, etc.) within the metadata of one or more images stored on client device 130.

In particular embodiments, social-networking system 160 may embed information in the metadata of the one or more images stored on client device 130 with information associated with edges 206 of social graph 200. In particular embodiments, social-networking system 160 may look to each edge 206 within nth degree of separation from user node 202 to determine which information social-networking system 160 may encode within the metadata of the one or more images stored client device 130. As an example and not by way of limitation, a user viewing the webpages (such as, for example, by using a web browser or a special-purpose application hosted by the user's client device 130) may indicate that he likes the concept represented by the concept node by selecting the "Like" icon (such as, for example, by clicking on the icon), which may cause client device 130 to transmit to the social-networking system a message indicating the user's liking of the sports bar associated with the webpage and create an edge between the user and the concept. In particular embodiments social-networking system 160 may store this edge information (user of client device 130 likes Murphy's Sports Bar, likes bars, likes sports bar, likes watching sporting events, etc.) within the metadata of one or more images stored on client device 130.

In particular embodiments, social-networking system 160 may use facial recognitions tools to determine the names and identities of other users captured by the images stored on client device 130 or on social-networking system 160. For example, social-networking system 160 may analyze the individuals found in Tom Brady's camera roll (or on social-networking system 160) and determine that Bill Belichick is found in multiple images stored on the camera roll. In particular embodiments, social-networking system 160 may determine whether Bill Belichick is a user of social-networking system 160. If Bill Belichick is a user of social-networking system 160, social-networking system 160 may also embed information within the metadata that would be beneficial for a system, service, or application to know about Bill Belichick and Tom Brady's relationship. In particular embodiments, social-networking system 160 may determine whether Tom Brady and Bill Belichick share any edges or concept nodes, and if the two users share some common information, social-networking system 160 may determine what information to insert in the available storage. For example, social-networking system 160 may determine Tom Brady and Bill Belichick each are connected to the concept node corresponding to the card game Magic. In determining this connection, social-networking system 160 may insert information in the available space indicating Tom Brady enjoys playing card games and in particular, Magic.

In further embodiments, social-networking system 160 may perform facial recognition on all of the images stored on client device's 130 camera roll or on social-networking system 160. In particular embodiments, social-networking system 160 may determine certain individuals appear more frequently than other individuals. In particular embodiments, social-networking system 160 may determine the individuals that appear most frequently in the camera roll (or on social-networking system 160) are individuals whom Tom Brady may be closer with than other individuals. In particular embodiments, social-networking system 160 may determine whether the individuals that appear frequently in the camera roll are also associated with social-networking system 160. In particular embodiments, in determining certain users appear frequently in Tom Brady's camera roll, social-networking system 160 may assume Tom Brady is interested in the same or similar interests of the frequently appearing users. For example, if three frequently appearing individuals all 'like' Rage Against the Machine, but Tom Brady has not 'liked' Rage Against the Machine, it may be inferred that Tom Brady may also like Rage Against the Machine. In particular embodiments, social-networking system 160 may embed information in the metadata within the metadata field that Tom Brady likes Rage Against the Machine.

In particular embodiments, social-networking system 160 may exclude certain information from being embedded within the metadata. For example, social-networking system 160 may determine from the social graph information that Tom Brady's wife is Gisèle Bündchen. In particular embodiments, social-networking system 160 may determine to exclude such information from the metadata field. In particular embodiments, social-networking system 160 may exclude other types of identifying information from the metadata field, for example, the names of Tom Brady's friends, or children.

In particular embodiments, the embedded information may relate to the security and integrity of the file. In particular embodiments, a checksum of the user information may also be stored with the data in order to verify the integrity of the data contained in the file (e.g., no modifications, updates, or additions to the file have been made). In particular embodiments, a checksum or hash sum may be a small-size stored in the metadata after social-networking system 160 has converted the known format to a sampled format. In particular embodiments, social-networking system 160 may use the checksum in determining whether or not the current file has been altered or corrupted. In further embodiments, upon social-networking system 160 determining the file has been altered or corrupted, social-networking system 160 may choose to not rely on the metadata associated with the altered file.

In further embodiments, a hash value may be assigned to the particular file to ensure the file has not been altered. In particular embodiments, social-networking system 160 may assign a hash value to the file. In further embodiments, a hash-based verification may ensure that the file has not been corrupted by comparing the file's hash value to a previously calculated value. In the files hash value and the previously calculated value match, social-networking system 160 may presume the file has been unmodified.

In further embodiments, the information to be embedded within the metadata may be encrypted. In particular embodiments, social-networking system 160 may encrypt the information by encoding the information in such a way that only an authorized party may be read the information. In particular embodiments, social-networking system 160 may encrypt the information with any type of encryption method known in the art. In particular embodiments, social-networking system 160 may use a pseudo-random encryption key for encrypting the information embedded in the metadata.

In particular embodiments, to ensure the embedded information is not lost during a particular modification action (e.g., compression, altering, sending, editing, etc.) a system may first determine the file contains a sampled format. After detecting the file contains a sampled format, the system may first extract the information embedded in the metadata. For example, either by the direction of a user of a computing device or by direction of a computing system, images may be transferred between one device to another, or simply compressed to save file space. In particular embodiments, before performing the above action, a system may first determine whether or not the one or more images contain a sampled format with embedded information. In particular embodiments, if a system determines one or more images contain embedded information within the metadata, the system may first extract the embedded information, perform the action requested by the user or the system, and after the performed action, re-inserting the embedded data within the metadata.

In particular embodiments, social-networking system 160 may place an identification marker within embedded information to indicate that the file contains embedded metadata. As an example and not by way of limitation, social-networking system 160 may encode the first byte of available space with a unique identifier indicating that the file contains embedded data. In particular embodiments, the byte containing the identifying marker may contain substantially the same data stored within the byte in the known format, but an additional line, identifier, variable, string, or value may be included such that a subsequent system may recognize the identifying marker only if the system knows what it is looking for in the sampled format.

In particular embodiments, social-networking system 160 may separate embedded information into a plurality of chunks of data and then place each chunk of data into one of the available spaces in the sampled format. In further embodiments, each chunk of data may be comprised of a header portion and include a sequence identification for the chunk. In further embodiments, a system may first scramble the chunks of data before inserting the chunks into one or more of the available spaces in the sampled format. In particular embodiments, upon embedding information in the metadata, the embedded information may then be provided to a subsequent service or application.

In particular embodiments, social-networking system 160 may hide any type of data within the associated metadata. As described above, social-networking system 160 may store certain social graph information corresponding to edges, user nodes, or concept nodes. In particular embodiments, social-networking system 160 may embed information in the metadata to prevent other users, applications, third-party applications, etc. from finding the embedded metadata. In particular embodiments, social-networking system 160 may hide any type of user identifying information in the available spaces.

Figure 5:
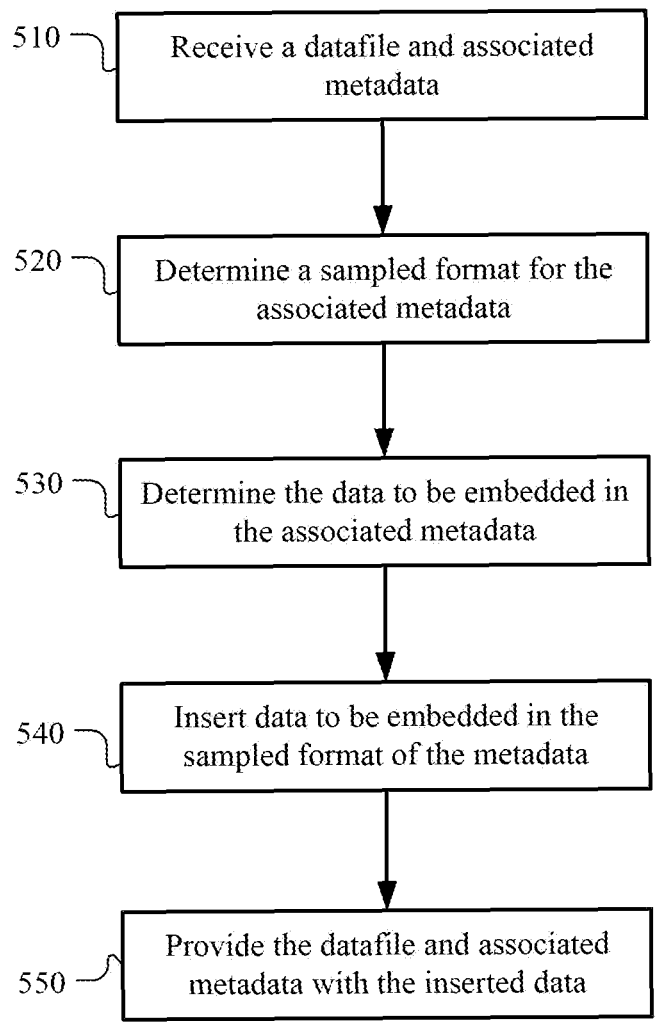
FIG. 5 illustrates an example method for embedding information within metadata.

FIG. 5 illustrates an example method 500 for embedding information within metadata. The method may begin at step 510, where a computing device may receive a datafile and associated metadata, wherein the associated metadata has a reserved area of storage space and a known format. At step 520, the computing device may determine a sampled format for the associated metadata, wherein the sampled format creates available space within the reserved area of storage space. At step 530, the computing device may determine the information to be embedded in the associated metadata. At step 540, the computing device may embed information with the metadata into at least one of the available spaces in the metadata field. At step 550, the computing device may provide the datafile and the associated metadata with the inserted data. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for inserting embedded data within metadata including the particular steps of the method of FIG. 5, this disclosure contemplates any suitable method for inserting embedded data within metadata including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In particular embodiments, the information stored in the available space may aid a subsequent program in determining relevant information for the user. As an example and not by way of limitation, a user who opens an application or service for the first time may not have any friends, links, or recommendations. This is because that upon using the service for the first time, the service or system knows little to nothing about the user of the service. In particular embodiments, the only information a service may know about a new user is the information a user has allowed to be shared with the service. In particular embodiments, many applications and services request a user to grant access to said user's camera roll. That is, the camera roll may be considered a shared space between the user and the service. In particular embodiments, a service may be able to access a user's camera roll and read through the metadata stored on one or all of the images. In particular embodiments, a service may determine that one or more photos were taken within a particular city at a particular time, however this information is not especially helpful in determining which type of information a user may interested.

In particular embodiments, a service or application may access the camera roll of a user and determine whether one or more of the images stored on client device 130 contain metadata in a sampled format. In further embodiments, upon determining one or more files, datafiles, images, etc. contains metadata in a sampled format with embedded information, the system may retrieve this information. In particular embodiments, retrieving this data of information may allow a service or application to provide more relevant material to a user upon creating, starting, or simply accessing the service of application. As an example and not by way of limitation, upon retrieving information from the sampled format indicating that the user is a sixteen year old boy, likes skateboarding, and plays Tony Hawk games, the new service or application may push skateboarding related material to the user.

In particular embodiments, a subsequent service or application may determine the associated metadata conforms to a sampled format. In particular embodiments, such service may need to contact the service or application that originally stored the embedded information within the available spaces. In particular embodiments, the inserted metadata may be stored in a data store of the service or application that originally stored the data. In further embodiments, the data store may be accessible by at least one other application installed on the computing device. In particular embodiments, the application may access the application or service that originally stored the information within the available spaces in the metadata field. In particular embodiments, the subsequent application that extracts the data may communicate with the service or application that originally stored the information to determine how to decrypt or unhash the stored data. In particular embodiments, the subsequent application that extracts the data may communicate with the service or application that originally stored the information to determine how to compute the checksum stored with the extracted data. In further embodiments, the application or service may communicate with the original service that stored the sampled format in order to determine how to reassemble the inserted data based on the extracted chunks.

In particular embodiments, after a service or application extracts the data stored within the sampled format, the service or application may determine how to apply or use the extracted information. In particular embodiments, the extracted information may be used by the service or application to suggest content and recommendations for the user of the service or application. As an example, if a subsequent application extracts the information and finds that the user is a 30 year old male, who lives in San Francisco, and likes Tech Crunch, the system may generate a recommendation that the user follow Elon Musk, or generate news stories dealing with technology news.

Particular embodiments may embed information into a metadata field of any type of datafile stored in a common area of a computing device that may be accessed by multiple applications, wherein the metadata field may be determined to have available space for the embedded information. In particular embodiments, the embedded information may be duplicated and/or split up between different metadata fields of one or more datafiles.

Figure 6:
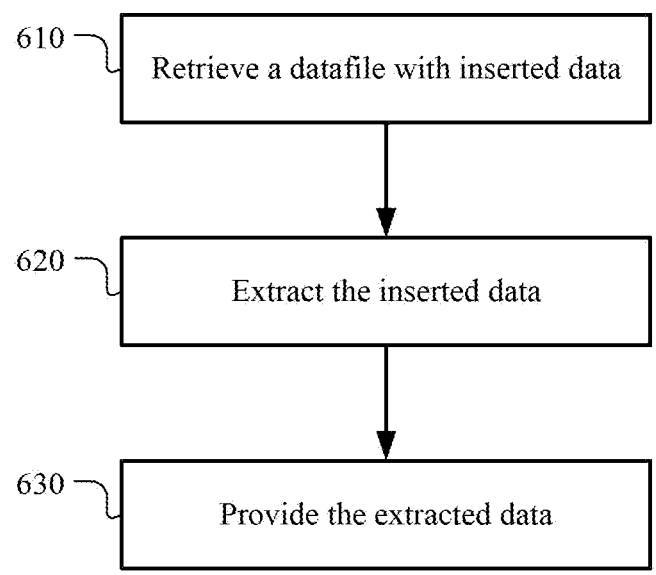
FIG. 6 illustrates an example for retrieving embedded information within metadata.

FIG. 6 illustrates an example method 600 for extracting embedded data stored in metadata. The method may begin at step 610, where a computing device may retrieve, by an application executing on the computing device, from a data store accessible by at least one other application installed on the computing device, a datafile and associated metadata with inserted data, wherein the associated metadata conforms to a sampled format. At step 620, a computing device may extract by the application, the inserted data from the associated metadata based at least on the sampled format. At step 630, providing the extracted data. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for extracting embedded data stored in metadata including the particular steps of the method of FIG. 6, this disclosure contemplates any suitable method for extracting embedded data stored in metadata including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
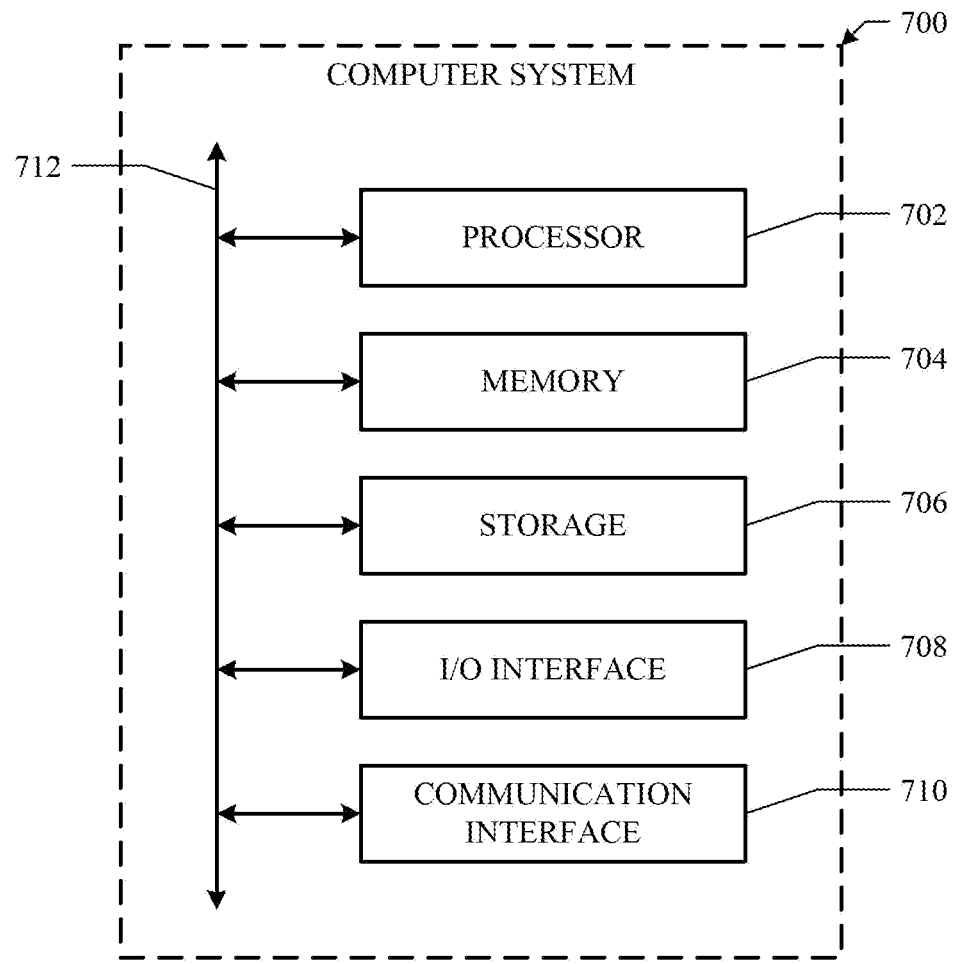
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitations one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM).

Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a computing device, receiving a datafile and associated metadata, wherein the associated metadata comprises color profile data in a reserved area of storage space, wherein the color profile data is in a known format and has a first size;

by the computing device, determining a sampled format based on the color profile data, wherein the sampled format creates available spaces within the reserved area of storage space;

by the computing device, converting the color profile data into the sampled format, wherein the converted color profile data has a second size less than the first size, wherein after converting, the reserved area of storage space has one or more available spaces for storing additional data;

by the computing device, determining data to be embedded in the associated metadata in the one or more available spaces in the reserved area of storage space of the associated metadata;

by the computing device, separating the data to be embedded into a plurality of chunks, wherein each of the chunks comprises a sequence identification for the chunk, wherein the sequence identification is configured to be used for re-assembling the chunks into the data;

by the computing device, scrambling the chunks;

by the computing device, inserting the scrambled chunks into the one or more available spaces created after the converting of the color profile data; and by the computing device, providing the datafile and the associated metadata with the inserted scrambled chunks.

2. The method of claim 1, wherein the datafile comprises a binary object.

3. The method of claim 2, wherein the binary object comprises a JPEG image and the associated metadata comprises a color profile of the JPEG image.

4. The method of claim 3, wherein the sampled format comprises TINYsRGB.

5. The method of claim 1, wherein the determining of the sampled format further comprises confirming that the known format is the sampled format.

6. The method of claim 1, wherein the data embedded in the associated metadata is prevented from being found by other users or third-party applications.

7. The method of claim 1, wherein the data to be embedded is encrypted, hashed, comprises a checksum or a header portion.

8. The method of claim 1, wherein the data to be embedded in the associated metadata is duplicated or split up, or both duplicated and split up between different metadata fields of the datafile.

9. The method of claim 1, wherein the data to be embedded in the associated metadata is duplicated or split up, or both duplicated and split up between different metadata fields of more than one datafiles.

10. The method of claim 1, wherein the providing of the datafile and the associated metadata with the inserted scrambled chunks comprises storing, in a data store accessible by a least one other application installed on the computing device, the datafile and the associated metadata with the inserted scrambled chunks.

11. The method of claim 1, further comprising:
retrieving, by an application executing on the computing device, from a data store accessible by at least one other application installed on the computing device, the datafile and the associated metadata with the inserted scrambled chunks, wherein the associated metadata comprises the converted color profile data in the sampled format;
extracting, by the computing device, the inserted scrambled chunks from the associated metadata;
re-assembling, by the computing device, the data embedded in the associated metadata based on the extracted scrambled chunks; and
providing, by the computing device, the re-assembled data.

12. The method of claim 11, further comprising:
computing a checksum of the re-assembled data and comparing the computed checksum to a checksum value stored with the re-assembled data.

13. The method of claim 11, wherein the providing of the re-assembled data comprises:
sending a request comprising the re-assembled data to a server; and
receiving suggested content and recommendations for a user in response to the request.

14. One or more computer-readable non-transitory storage media embodying software that is operable when executed to:
receive a datafile and associated metadata, wherein the associated metadata comprises color profile data in a reserved area of storage space, wherein the color profile data is in a known format and has a first size;
determine a sampled format based on the color profile data, wherein the sampled format creates available spaces within the reserved area of storage space;
convert the color profile data into the sampled format, wherein the converted color profile data has a second size less than the first size, wherein after converting, the reserved area of storage space has one or more available spaces for storing additional data;
determine data to be embedded in the associated metadata in the one or more available spaces in the reserved area of storage space of the associated metadata;
separate the data to be embedded into a plurality of chunks, wherein each of the chunks comprises a sequence identification for the chunk, wherein the sequence identification is configured to be used for re-assembling the chunks into the data;
scramble the chunks;
insert the scrambled chunks into the one or more available spaces created after the converting of the color profile data; and
provide the datafile and the associated metadata with the inserted scrambled chunks.

15. The media of claim 14, wherein the datafile comprises a binary object.

16. The media of claim 14, wherein the binary object comprises a JPEG image and the associated metadata comprises a color profile of the JPEG image.

17. A system comprising:
one or more processors; and
a memory coupled to the processors comprising instructions executable by the processors, the processors operable when executing the instructions to:
receive a datafile and associated metadata, wherein the associated metadata comprises color profile data in a reserved area of storage space, wherein the color profile data is in a known format and has a first size;
determine a sampled format based on the color profile data, wherein the sampled format creates available spaces within the reserved area of storage space;
convert the color profile data into the sampled format, wherein the converted color profile data has a second size less than the first size, wherein after converting, the reserved area of storage space has one or more available spaces for storing additional data;

determine data to be embedded in the associated metadata in the one or more available spaces in the reserved area of storage space of the associated metadata;

separate the data to be embedded into a plurality of chunks, wherein each of the chunks comprises a sequence identification for the chunk, wherein the sequence identification is configured to be used for re-assembling the chunks into the data;

scramble the chunks;

insert the scrambled chunks into the one or more available spaces created after the converting of the color profile data; and provide the datafile and the associated metadata with the inserted scrambled chunks.

18. The system of claim 17, wherein the datafile comprises a binary object.

* * * * *